US012804386B2

(12) United States Patent
Li et al.

(10) Patent No.: US 12,804,386 B2
(45) Date of Patent: Nov. 17, 2026

(54) COMMUNICATION METHOD AND APPARATUS

(71) Applicant: HUAWEI TECHNOLOGIES CO., LTD., Shenzhen (CN)

(72) Inventors: Chenwan Li, Beijing (CN); Lei Chen, Beijing (CN); Yiling Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 18/613,766

(22) Filed: Mar. 22, 2024

(65) Prior Publication Data

US 2024/0236658 A1 Jul. 11, 2024

Related U.S. Application Data

(63) Continuation of application No. PCT/CN2022/121196, filed on Sep. 26, 2022.

(30) Foreign Application Priority Data

Sep. 26, 2021 (CN) .......................... 202111130669.9

(51) Int. Cl.

*H04W 12/02* (2009.01)
*H04W 12/033* (2021.01)
*H04W 74/0833* (2024.01)

(52) U.S. Cl.

CPC ......... *H04W 12/02* (2013.01); *H04W 12/033* (2021.01); *H04W 74/0833* (2013.01)

(58) Field of Classification Search

CPC . H04W 12/02; H04W 12/033; H04W 12/037; H04W 74/08; H04W 74/0833

(Continued)

(56) References Cited

U.S. PATENT DOCUMENTS 11,062,190 B1 * 7/2021 Diorio ................ G06K 19/0723
2015/0363130 A1 * 12/2015 Nakano ............... G06F 11/0766
711/103

(Continued)

FOREIGN PATENT DOCUMENTS

CN 106886734 A * 6/2017 ......... G06K 7/10019

OTHER PUBLICATIONS

ANONYMOUS: "Specification for RFID Air Interface, EPC Radio-Frequency Identity Protocols Class-1 Generation-2 UHF RFID Protocol for Communications at 860 MHz—960 MHz Version 1.2.0", Oct. 23, 2008, total 108 pages.

*Primary Examiner* — Hirdepal Singh
(74) *Attorney, Agent, or Firm* — Rimon PC

(57) ABSTRACT

This application provides a communication method and apparatus, to resolve the problem of information exposure causing low security that occurs when a tag is triggered to perform random access in a communication network. The method includes receiving first signaling, determining, based on the first signaling, a second mask stored at a first storage location, and performing random access when a first mask matches the second mask. The first signaling indicates the first storage location and the first mask, the first signaling carries a first mask identifier, and the first mask identifier identifies the first storage location and/or the first mask. In embodiments of this application, a correspondence between a mask identifier and a storage location and/or a correspondence between the mask identifier and a mask are/is negotiated in advance, so that a part or all of masks and storage locations can be implicitly indicated by using the mask identifier.

20 Claims, 7 Drawing Sheets

(58) Field of Classification Search
USPC .......................................................... 455/411
See application file for complete search history.

(56) References Cited

U.S. PATENT DOCUMENTS

2018/0356512 A1* 12/2018 Alkhabbaz .............. G01F 23/68
2021/0142020 A1* 5/2021 Casavant ......... G06K 19/06028
2024/0305431 A1* 9/2024 Brewster ............ G06K 19/0723

* cited by examiner

COMMUNICATION METHOD AND APPARATUS

CROSS-REFERENCE TO RELATED APPLICATIONS

This application is a continuation of International Application No. PCT/CN2022/121196, filed on Sep. 26, 2022, which claims priority to Chinese Patent Application No. 202111130669.9, filed on Sep. 26, 2021. The disclosures of the aforementioned applications are hereby incorporated by reference in their entireties.

TECHNICAL FIELD

This application relates to the field of communication technologies, and in particular, to a communication method and apparatus.

BACKGROUND

In development of communication, to reduce power consumption of a terminal device, a passive radio frequency identification (RFID) technology is introduced in a communication network. A working principle of the RFID technology is as follows: A tag converts a radio signal sent by a reader/writer into energy, and is driven to work by using the energy, so that the tag can perform processing such as decoding and demodulation on the radio signal.

In the RFID technology, the tag accesses the reader/writer in the following process: The reader/writer sends mask information to the tag, where the mask information indicates a memory bank and a mask. The tag obtains information stored in the memory bank indicated by the mask information, and matches the information with the mask indicated by the mask information, to determine whether the tag is connected to the reader/writer.

In the RFID technology, the reader/writer depends on content stored in the memory bank of the tag to trigger the tag to perform access. However, in the communication network, if memory information of the tag is exposed, the tag may be tracked or is prone to other risks. Therefore, how to trigger a tag to perform random access in a communication network is an urgent problem to be resolved.

SUMMARY

This application provides a communication method and apparatus, to resolve the problem that security is low when a tag is triggered to perform random access in a communication network.

According to a first aspect, this application provides a communication method. The method may be performed by a terminal device such as a tag, or may be performed by a chip or a circuit. The method includes: receiving first signaling, and determining, based on the first signaling, a second mask stored at a first storage location; and performing random access when a first mask matches the second mask. The first signaling indicates the first storage location and the first mask, the first signaling carries a first mask identifier, and the first mask identifier identifies the first storage location and/or the first mask.

In an embodiment of this application, a part or all of masks and storage locations can be implicitly indicated by using a mask identifier, thereby avoiding exposure of information stored at a storage location in the terminal device, and improving network security of the terminal device.

In a possible design, the first signaling may carry the first mask identifier and the first mask, and the first mask identifier identifies the first storage location. Alternatively, the first signaling may carry the first mask identifier and the first storage location, where the first mask identifier identifies the first mask. Alternatively, the first signaling may carry the first mask identifier, where the first mask identifier identifies the first mask and the first storage location.

In the foregoing implementation, exposure of memory information of the terminal device can be avoided.

In a possible design, before the first signaling is received, second signaling may be further received from an application layer server, where the second signaling carries N mask identifiers that include the first mask identifier, and N is an integer greater than 0; and a response message to the second signaling is sent to the application server, where the response message carries N storage locations, and the N storage locations are in a one-to-one correspondence with the N mask identifiers.

In the foregoing implementation, the terminal device and the application layer server pre-negotiate a correspondence between a mask identifier and a storage location, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, before the first signaling is received, third signaling may be further received from an application layer server, where the third signaling carries K mask identifiers and K storage locations, the K storage locations are in a one-to-one correspondence with the K mask identifiers, the K mask identifiers include the first mask identifier, and K is an integer greater than 0.

In the foregoing implementation, the terminal device and the application layer server pre-negotiate a correspondence between a mask identifier and a storage location, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, the second signaling or the third signaling is received by the terminal device after the terminal device receives a registration complete message. In the foregoing design, the terminal device can negotiate, with the application layer server based on an encrypted session, the correspondence between the mask identifier and the storage location, thereby improving network security of the terminal device.

In a possible design, a correspondence between the first mask identifier and the first storage location is preset. In the foregoing implementation, the terminal device and the application layer server may not need to negotiate a correspondence between a mask identifier and a storage location, thereby reducing implementation complexity of the terminal device.

In a possible design, before the first signaling is received, fourth signaling may be received from the application layer server, where the fourth signaling carries M mask identifiers that include the first mask identifier, and M is an integer greater than 0; and a response message to the fourth signaling is sent to the application server, where the response message carries M masks, and the M masks are in a one-to-one correspondence with the M mask identifiers.

In the foregoing implementation, the terminal device and the application layer server pre-negotiate a correspondence between a mask identifier and a mask, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, before the first signaling is received, fifth signaling may be further received from the application layer server, where the fifth signaling carries L mask identifiers and L masks, the L masks are in a one-to-one correspondence with the L mask identifiers, the L mask identifiers include the first mask identifier, and L is an integer greater than 0.

In the foregoing implementation, the terminal device and the application layer server pre-negotiate a correspondence between a mask identifier and a mask, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, a correspondence between the first mask identifier and the first mask is preset. In the foregoing implementation, the terminal device and the application layer server may not need to negotiate a correspondence between a mask identifier and a mask, thereby reducing implementation complexity of the terminal device.

In a possible design, the fourth signaling or the fifth signaling is received by the terminal device after the terminal device receives the registration complete message. In the foregoing design, the terminal device can negotiate, with the application layer server based on the encrypted session, the correspondence between the mask identifier and the mask, thereby improving network security of the terminal device.

In a possible design, the first mask identifier indicates at least two of the following: start address information of the first storage location, a length of the first storage location, or end address information of the first storage location. In the foregoing design, the terminal device can determine a corresponding storage location based on a mask identifier.

In a possible design, the first mask identifier further indicates a length of the second mask. In the foregoing design, accuracy of matching the first mask with the second mask by the terminal device can be improved.

In a possible design, that the first mask matches the second mask means that the first mask is the same as the second mask. Alternatively, that the first mask matches the second mask means that a quantity of bits that are the same in the first mask and the second mask is greater than a preset threshold.

According to a second aspect, this application provides a communication method. The method may be performed by a reader/writer, or may be performed by a chip or a circuit. The reader/writer may be an access network device or a terminal device. The method includes: receiving first signaling from a core network device, and sending the first signaling to at least one terminal device, where the first signaling indicates a first storage location and a first mask, the first signaling carries a first mask identifier, and the first mask identifier identifies the first storage location and/or the first mask.

In an embodiment of this application, a part or all of masks and storage locations can be implicitly indicated by using a mask identifier, thereby avoiding exposure of information stored at a storage location in the terminal device, and improving network security of the terminal device.

In a possible design, the first signaling may carry the first mask identifier and the first mask, and the first mask identifier identifies the first storage location. Alternatively, the first signaling may carry the first mask identifier and the first storage location, where the first mask identifier identifies the first mask. Alternatively, the first signaling may carry the first mask identifier, where the first mask identifier identifies the first mask and the first storage location.

In the foregoing implementation, exposure of memory information of the terminal device can be avoided.

In a possible design, a correspondence between the first mask identifier and the first storage location is preset. In the foregoing implementation, the terminal device and the application layer server may not need to negotiate a correspondence between a mask identifier and a storage location, thereby reducing implementation complexity of the terminal device.

In a possible design, before the first signaling is received, second signaling may be received from an application layer server, and the second signaling is forwarded to the terminal device, where the second signaling carries N mask identifiers that include the first mask identifier, and N is an integer greater than 0; and a response message to the second signaling is received from the terminal device, and the response message is forwarded to the application layer server, where the response message carries N storage locations, and the N storage locations are in a one-to-one correspondence with the N mask identifiers.

In the foregoing implementation, the terminal device and the application layer server pre-negotiate a correspondence between a mask identifier and a storage location, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, before the first signaling is received, third signaling may be received from the application layer server, and the third signaling is forwarded to the terminal device, where the third signaling carries K mask identifiers and K storage locations, the K storage locations are in a one-to-one correspondence with the K mask identifiers, the K mask identifiers include the first mask identifier, and K is an integer greater than 0.

In the foregoing implementation, the terminal device and the application layer server pre-negotiate a correspondence between a mask identifier and a storage location, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, the second signaling or the third signaling is received by the reader/writer after the reader/writer receives a registration complete message. In the foregoing design, the terminal device can negotiate, with the application layer server based on an encrypted session, the correspondence between the mask identifier and the storage location, thereby improving network security of the terminal device.

In a possible design, before the first signaling is received, fourth signaling may be received from an application layer server, and the fourth signaling is forwarded to the terminal device, where the fourth signaling carries M mask identifiers that include the first mask identifier, and M is an integer greater than 0; and a response message to the fourth signaling is received from the terminal device, and the response message is forwarded to the application layer server, where the response message carries M masks, and the M masks are in a one-to-one correspondence with the M mask identifiers.

In the foregoing implementation, the terminal device and the application layer server pre-negotiate a correspondence between a mask identifier and a mask, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, before the first signaling is received, fifth signaling may be received from the application layer server, and the fifth signaling is forwarded to the terminal device, where the fifth signaling carries L mask identifiers and L masks, the L masks are in a one-to-one correspondence with the L mask identifiers, the L mask identifiers include the first mask identifier, and L is an integer greater than 0.

In the foregoing implementation, the terminal device and the application layer server pre-negotiate a correspondence between a mask identifier and a mask, so that in a subsequent communication process, the terminal device may be indicated to perform random access based on the negotiated correspondence. Compared with a manner in which a storage location and a mask are directly sent, this application can avoid exposure of memory information of the terminal device, thereby improving network security of the terminal device.

In a possible design, the fourth signaling or the fifth signaling is received by the reader/writer after the reader/writer receives the registration complete message. In the foregoing design, the terminal device can negotiate, with the application layer server based on the encrypted session, the correspondence between the mask identifier and the mask, thereby improving network security of the terminal device.

In a possible design, the first mask identifier indicates at least two of the following: start address information of the first storage location, a length of the first storage location, or end address information of the first storage location. In the foregoing design, the terminal device can determine a corresponding storage location based on a mask identifier.

In a possible design, the first mask identifier further indicates a length of the second mask. In the foregoing design, accuracy of matching the first mask with the second mask by the terminal device can be improved.

According to a third aspect, this application provides a communication method. The method may be performed by a reader/writer, or may be performed by a chip or a circuit. The reader/writer may be an access network device or a terminal device. The method includes: receiving first signaling from a core network device, where the first signaling carries information about a first storage location and a first mask; and sending the first signaling to at least one terminal device.

According to the foregoing design, an RFID technology may be applied to a communication system, so that power consumption of the communication system can be reduced.

In a possible design, a first mask identifier indicates at least two of the following: start address information of the first storage location, a length of the first storage location, or end address information of the first storage location. In the foregoing design, the terminal device can determine a corresponding storage location based on a mask identifier.

In a possible design, the first mask identifier further indicates a length of a second mask. In the foregoing design, accuracy of matching the first mask with the second mask by the terminal device can be improved.

According to a fourth aspect, this application provides a communication method. The method may be performed by a terminal device such as a tag, or may be performed by a chip or a circuit. The method includes: receiving first signaling, where the first signaling carries a first mask and first information, the first information indicates a bit used as a mask in L bits stored in a first storage area, the first storage area is a preset storage area in a storage area of the terminal device, and L is an integer greater than 1; and determining, based on the first information and the bits stored in the first storage area, a second mask stored in the terminal device; and performing random access when a first mask matches the second mask.

In an embodiment of this application, a mask is indicated by using a fixed storage area, to avoid exposure of the entire storage area of a tag, thereby improving network security of the tag. In addition, a bit in the fixed storage area can be flexibly selected as a mask by using the first information, so that a tag can be flexibly selected to access a reader/writer.

In a possible design, the first storage area may support a rewrite operation of the reader/writer, so that different tags can be flexibly selected.

In a possible design, the first information is an m-bit bitmap, the bitmap indicates whether m bit groups included in the L bits are used as masks, one bit in the bitmap indicates whether one bit group is used as a mask, and m is an integer greater than 1 and less than L. In the foregoing design, a mask is indicated by using the bitmap. This can avoid direct exposure of content stored in the first storage area, and can flexibly indicate the mask, so that more masks can be indicated based on a limited storage area, and a terminal device can be flexibly selected to access the reader/writer.

In a possible design, the first information indicates that a start location of the second mask is a first bit location in the L bits; the first information indicates that a start location of the second mask is a first byte location in the L bits; or the first information indicates that a start location of the second mask is located in a first bit group in the L bits. In the foregoing design, the start location is indicated. This can avoid direct exposure of content stored in the first storage area, and can flexibly indicate the mask, so that more masks can be indicated based on a limited storage area, and a terminal device can be flexibly selected to access the reader/writer.

In a possible design, a first mask identifier further indicates a length of the second mask. In the foregoing design, accuracy of matching the first mask with the second mask by the terminal device can be improved.

In a possible design, that the first mask matches the second mask means that the first mask is the same as the second mask. Alternatively, that the first mask matches the second mask means that a quantity of bits that are the same in the first mask and the second mask is greater than a preset threshold.

According to a fifth aspect, this application provides a communication method. The method may be performed by a reader/writer, or may be performed by a chip or a circuit. The reader/writer may be an access network device or a terminal device. The method includes: receiving first signaling from a core network device, where the first signaling carries a first mask and first information, the first information indicates a bit used as a mask in L bits stored in a first storage area, the first storage area is a preset storage area in a storage area of the terminal device, and L is an integer greater than 1; and sending the first signaling to at least one terminal device.

In an embodiment of this application, a mask is indicated by using a fixed storage area, to avoid exposure of the entire storage area of a tag, thereby improving network security of the tag. In addition, a bit in the fixed storage area can be flexibly selected as a mask by using the first information, so that a tag can be flexibly selected to access a reader/writer.

In a possible design, the first storage area may support a rewrite operation of the reader/writer, so that different tags can be flexibly selected.

In a possible design, the first information is an m-bit bitmap, the bitmap indicates whether m bit groups included in the L bits are used as masks, one bit in the bitmap indicates whether one bit group is used as a mask, and m is an integer greater than 1 and less than L. In the foregoing design, a mask is indicated by using the bitmap. This can avoid direct exposure of content stored in the first storage area, and can flexibly indicate the mask, so that more masks can be indicated based on a limited storage area, and a terminal device can be flexibly selected to access the reader/writer.

In a possible design, the first information indicates that a start location of a second mask is a first bit location in the L bits; the first information indicates that a start location of a second mask is a first byte location in the L bits; or the first information indicates that a start location of a second mask is located in a first bit group in the L bits. In the foregoing design, the start location is indicated. This can avoid direct exposure of content stored in the first storage area, and can flexibly indicate the mask, so that more masks can be indicated based on a limited storage area, and a terminal device can be flexibly selected to access the reader/writer.

In a possible design, a first mask identifier further indicates a length of the second mask. In the foregoing design, accuracy of matching the first mask with the second mask by the terminal device can be improved.

According to a sixth aspect, this application further provides a communication apparatus. The communication apparatus can implement either method provided in the first aspect or the fourth aspect. The communication apparatus may be implemented by hardware, or may be implemented by hardware executing corresponding software. The hardware or the software includes one or more units or modules corresponding to the foregoing function.

In a possible design, the communication apparatus includes a processor, and the processor is configured to support the communication apparatus in performing a corresponding function of the terminal device in the foregoing methods. The communication apparatus may further include a memory, and the memory may be coupled to the processor, and store program instructions and data that are necessary for the communication apparatus. Optionally, the communication apparatus further includes an interface circuit. The interface circuit is configured to support communication between the communication apparatus and a device such as a reader/writer.

For example, the communication apparatus has a function of implementing the method provided in the first aspect. The processor may be configured to: receive first signaling through the communication interface, where the first signaling indicates a first storage location and a first mask, the first signaling carries a first mask identifier, and the first mask identifier identifies the first storage location and/or the first mask; determine, based on the first signaling, a second mask stored at the first storage location; and perform random access through the communication interface when the first mask matches the second mask.

For another example, the communication apparatus has a function of implementing the method provided in the fourth aspect. The processor may be configured to: receive first signaling through the communication interface, where the first signaling carries a first mask and first information, the first information indicates a bit used as a mask in L bits stored in a first storage area, the first storage area is a preset storage area in a storage area of the terminal device, and L is an integer greater than 1; and determine, based on the first information and the bits stored in the first storage area, a second mask stored in the terminal device; and perform random access through the communication interface when the first mask matches the second mask.

In a possible design, the communication apparatus includes corresponding function modules, configured to implement steps in the foregoing methods. The function may be implemented by hardware, or may be implemented by hardware executing corresponding software. The hardware or software includes one or more modules corresponding to the foregoing function.

In a possible design, a structure of the communication apparatus includes a processing unit (or a processing module) and a communication unit (or a communication module). These units may perform corresponding functions in the foregoing method examples. For details, refer to the descriptions in the method provided in the first aspect or the fourth aspect. Details are not described herein again.

For example, the communication apparatus has a function of implementing the method provided in the first aspect. The communication unit is configured to receive first signaling, where the first signaling indicates a first storage location and a first mask, the first signaling carries a first mask identifier, and the first mask identifier identifies the first storage location and/or the first mask. The processing unit is configured to: determine, based on the first signaling, a second mask stored at the first storage location; and perform random access by using the communication unit when the first mask matches the second mask.

For another example, the communication apparatus has a function of implementing the method provided in the fourth aspect. The communication unit is configured to receive first signaling, where the first signaling carries a first mask and first information, the first information indicates a bit used as a mask in L bits stored in a first storage area, the first storage area is a preset storage area in a storage area of the terminal device, and L is an integer greater than 1. The processing unit is configured to: determine, based on the first information and the bits stored in the first storage area, a second mask stored in the terminal device; and perform random access by using the communication unit when the first mask matches the second mask.

According to a seventh aspect, this application further provides a communication apparatus. The communication apparatus has a function of implementing any method provided in the second aspect, the third aspect, or the fifth aspect. The communication apparatus may be implemented by hardware, or may be implemented by hardware executing corresponding software. The hardware or the software includes one or more units or modules corresponding to the foregoing function.

In a possible design, the communication apparatus includes a processor, and the processor is configured to support the communication apparatus in performing a corresponding function of the reader/writer in the foregoing methods. The communication apparatus may further include a memory, and the memory may be coupled to the processor, and store program instructions and data that are necessary for the communication apparatus. Optionally, the communication apparatus further includes a first interface circuit and a second interface circuit. The first interface circuit is configured to support communication between the communication apparatus and a device such as a core network device. The second interface circuit is configured to support communication between the communication apparatus and a device such as a terminal device. The first interface circuit and the second interface circuit may be a same interface circuit, or may be different circuits.

For example, the communication apparatus has a function of implementing the method provided in the second aspect. The processor may be configured to: receive first signaling from the core network device by using the first interface circuit, where the first signaling indicates a first storage location and a first mask, the first signaling carries a first mask identifier, and the first mask identifier identifies the first storage location and/or the first mask; and send the first signaling to at least one terminal device by using the second interface circuit.

For example, the communication apparatus has a function of implementing the method provided in the third aspect. The processor may be configured to: receive first signaling from the core network device by using the first interface circuit, where the first signaling carries information about a first storage location and a first mask; and send the first signaling to at least one terminal device by using the second interface circuit.

For example, the communication apparatus has a function of implementing the method provided in the fifth aspect. The processor may be configured to: receive first signaling from the core network device by using the first interface circuit, where the first signaling carries a first mask and first information, the first information indicates a bit used as a mask in L bits stored in a first storage area, the first storage area is a preset storage area in a storage area of the terminal device, and L is an integer greater than 1; and send the first signaling to at least one terminal device by using the second interface circuit.

In a possible design, the communication apparatus includes corresponding function modules, configured to implement steps in the foregoing methods. The function may be implemented by hardware, or may be implemented by hardware executing corresponding software. The hardware or software includes one or more modules corresponding to the foregoing function.

In a possible design, a structure of the communication apparatus includes a processing unit (or a processing module), a first communication unit (or a first communication module), and a second communication unit (or a second communication module). These units may perform corresponding functions in the foregoing method examples. For details, refer to the descriptions in the method provided in the second aspect, the third aspect, or the fifth aspect. Details are not described herein again. The first communication unit and the second communication unit may be a same communication unit, or may be different communication units.

For example, the communication apparatus has a function of implementing the method provided in the second aspect. The processing unit may be configured to: receive first signaling from the core network device by using the first communication unit, where the first signaling indicates a first storage location and a first mask, the first signaling carries a first mask identifier, and the first mask identifier identifies the first storage location and/or the first mask; and send the first signaling to at least one terminal device by using the second communication unit.

For example, the communication apparatus has a function of implementing the method provided in the third aspect. The processing unit may be configured to: receive first signaling from the core network device by using the first communication unit, where the first signaling carries information about a first storage location and a first mask; and send the first signaling to at least one terminal device by using the second communication unit.

For example, the communication apparatus has a function of implementing the method provided in the fifth aspect. The processing unit may be configured to: receive first signaling from the core network device by using the first communication unit, where the first signaling carries a first mask and first information, the first information indicates a bit used as a mask in L bits stored in a first storage area, the first storage area is a preset storage area in a storage area of the terminal device, and L is an integer greater than 1; and send the first signaling to at least one terminal device by using the second communication unit.

According to an eighth aspect, a communication apparatus is provided. The communication apparatus includes a processor and an interface circuit. The interface circuit is configured to: receive a signal from another communication apparatus other than the communication apparatus and transmit the signal to the processor, or send a signal from the processor to another communication apparatus other than the communication apparatus. The processor is configured to implement the method according to any one of the first aspect, the fourth aspect, or the possible designs thereof by using a logic circuit or executing code instructions.

According to a ninth aspect, a communication apparatus is provided. The communication apparatus includes a processor and an interface circuit. The interface circuit is configured to receive a signal from another communication apparatus other than the communication apparatus and transmit the signal to the processor, or send a signal from the processor to the another communication apparatus other than the communication apparatus. The processor is configured to implement the method according to any one of the second aspect, the third aspect, the fifth aspect, or the possible designs thereof by using a logic circuit or executing code instructions.

According to a tenth aspect, a computer-readable storage medium is provided. The computer-readable storage medium stores a computer program or instructions. When the computer program or the instructions are executed by a processor, the method according to any one of the first aspect to the fifth aspect or the possible designs thereof is implemented.

According to an eleventh aspect, a computer program product storing instructions is provided. When the instructions are run by a processor, the method according to any one of the first aspect to the eighth aspect or the possible designs thereof is implemented.

According to a twelfth aspect, a chip system is provided. The chip system includes a processor, and may further include a memory, configured to implement the method according to any one of the first aspect to the fifth aspect or the possible designs thereof. The chip system may include a chip, or may include a chip and another discrete component.

According to a thirteenth aspect, a communication system is provided, where the system includes the apparatus (for example, a reader/writer) according to the first aspect and the apparatus (for example, a terminal device) according to the second aspect, and may further include an application layer server.

According to a fourteenth aspect, a communication system is provided, where the system includes an application layer server and the apparatus (for example, a reader/writer) according to the third aspect, and may further include a terminal device.

According to a fifteenth aspect, a communication system is provided, where the system includes the apparatus (for example, a network device) according to the fourth aspect and the apparatus (for example, a terminal device) according to the fifth aspect, and may further include an application layer server.

DESCRIPTION OF EMBODIMENTS

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

Figure 1:
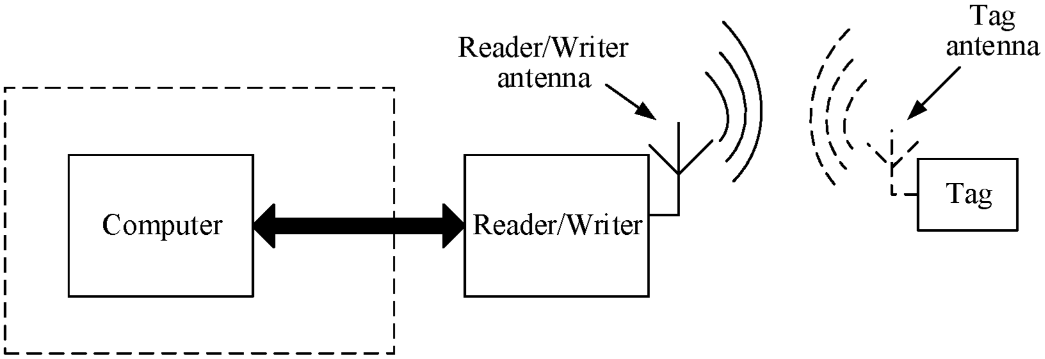
FIG. 1 is a schematic architectural diagram of an RFID system according to an embodiment of this application.

(1) RFID technology: After entering a magnetic field, a tag receives a radio frequency signal sent by a reader/writer, and sends, by using energy obtained through an induction current, product information (such as a passive tag) stored in a chip. For example, refer to FIG. 1. FIG. 1 is a schematic architectural diagram of an RFID system. The RFID system includes a reader/writer (which may also be referred to as a reader, or referred to as an interface device (IFD)), a tag, and an antenna. The reader/writer is a device or an apparatus that can obtain and process data of the electronic tag. The reader/writer may be used as an independent device, or may be embedded in another device or system. The reader/writer may send a radio frequency signal to the tag through a reader/writer antenna, to query data from or write data into the tag. The reader/writer may also be connected to another device (for example, a computer in FIG. 1) through a communication interface, to transmit data locally stored in the reader/writer or data obtained from the tag to the another device. A specific form of the reader/writer is not limited in embodiments of this application. For example, the reader/writer may be a terminal device, a network device (for example, an access network device), a device having a function of reading and writing the electronic tag, or a device in another possible form. It should be understood that the computer in FIG. 1 is not mandatory for the system, and therefore is shown by using a dashed line.

The tag, that is also referred to as an electronic tag or an RFID tag, is a micro wireless transceiver apparatus, and mainly includes a built-in tag antenna, a coupling element, and a chip. The chip has storage space that can support the reader/writer in reading or writing tag data. After receiving, by using the tag antenna, the radio frequency signal sent by the reader/writer, the tag may implement coupling of the radio frequency signal by using the coupling element, so that energy can be provided for the chip of the tag on a coupling channel, and tag data stored on the chip may be fed back to the reader/writer by using the tag antenna. The tag may include an active tag, a passive tag, and a semi-active tag. The passive tag may also be referred to as a passive internet of things (IOT) device. The tag may also be considered as a terminal device.

(2) Terminal device: is also referred to as user equipment (UE), a mobile station (MS), a mobile terminal (MT), or the like, and is a device that provides voice and/or data connectivity for users, such as a handheld device or a vehicle-mounted device having a wireless connection function. Currently, some examples of the terminal are: a mobile phone, a tablet computer, a notebook computer, a handheld computer, a mobile internet device (MID), a wearable device, a virtual reality (VR) device, an augmented reality (AR) device, a wireless terminal in industrial control, a wireless terminal in self-driving, a wireless terminal in remote medical surgery, a wireless terminal in smart grid, a wireless terminal in transportation safety, a wireless terminal in a smart city, a wireless terminal in a smart home, and the like. The terminal device may also include a tag, a passive internet of things device, or an active internet of things device based on a passive technology, for example, a semi-passive tag. The semi-passive tag is an electronic tag that carries power but does not transmit a radio frequency signal. The semi-passive tag may also be an energy storage tag, a solar charging tag, or the like. The terminal device may further include a read/write device such as a reader/writer and a reader, and an excitation device or an auxiliary device that can send only a downlink excitation signal or data to the tag.

In embodiments of this application, an apparatus configured to implement a function of the terminal device may be a terminal device, or may be an apparatus that can support the terminal device in implementing the function, for example, a chip system. The apparatus may be installed in the terminal device. In embodiments of this application, the chip system may include a chip, or may include a chip and another discrete component. In the technical solutions provided in embodiments of this application, an example in which the apparatus configured to implement the function of the terminal is the terminal device is for describing the technical solutions provided in embodiments of this application.

(3) Access network device: is a radio access network (RAN) node (or device) that connects a terminal device to a radio network, and may also be referred to as a base station. Currently, some examples of the RAN node are: a continuously evolved NodeB (gNB), a transmission reception point (TRP), an evolved NodeB (evolved NodeB, eNB), a radio network controller (RNC), a NodeB (NodeB, NB), a base station controller (BSC), a base transceiver station (BTS), a home base station (for example, a home evolved NodeB or home NodeB, HNB), a baseband unit (BBU), a wireless fidelity (Wi-Fi) access point (AP), or the like. In addition, in a network structure, the access network device may include a central unit (CU) node, a distributed unit (DU) node, or a RAN device including a CU node and a DU node. The RAN device including the CU node and the DU node splits protocol layers of an eNB in a long term evolution (LTE) system. Functions of some protocol layers are centrally controlled by the CU, functions of some or all of remaining protocol layers are distributed in the DU, and the CU centrally controls the DU. The access network device may further include a read/write device such as a reader/writer and a reader, and an excitation device or an auxiliary device that can send only a downlink excitation signal or data to the tag.

(4) Core network device: is a general term of a plurality of functional entities that are used on a network side to manage a user, transmit data, and configure an access network device, and may be configured to provide a core network service for a terminal device that accesses the access network device. The core network device may correspond to different devices in different systems. For example, in 4G, the core network device may correspond to a mobility management entity (MME) and/or a serving gateway (S-GW). In a 5th generation (5G) communication system, the core network device may correspond to an access and mobility management function (AMF) entity, a session management function (SMF) entity, a user plane function (UPF) entity, or the like.

In embodiments of this application, "at least one" means one or more, and "a plurality of" means two or more. The term "and/or" describes an association relationship between associated objects and indicates that three relationships may exist. For example, A and/or B may indicate the following three cases: Only A exists, both A and B exist, and only B exists. A and B each may be singular or plural. The character "/" generally indicates an "or" relationship between the associated objects. "At least one of the following items (pieces)" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

Unless otherwise stated on the contrary, ordinal terms such as "first" and "second" mentioned in embodiments of this application are used to distinguish between a plurality of objects, and are not intended to limit sizes, content, a sequence, a time sequence, priorities, importance degrees, or the like of the plurality of objects. For example, the first signaling and the second signaling are merely for distinguishing between different signaling, but do not indicate different content, priorities, importance, or the like of the two pieces of signaling.

The foregoing describes some noun concepts used in embodiments of this application. The following describes technical features of embodiments of this application.

In the RFID technology, a reader/writer may send a select command to select, by using a mask, a group of tags for random access. The select command includes a memory bank (Membank) and a mask, where Membank may indicate a user area, a tag identifier (TID) area, an electronic product code (EPC) area, and a reserved area.

In the RFID technology, the reader/writer depends on content stored in a memory bank of a tag to trigger the tag to perform access, and the reader/writer indicates a memory bank and a mask to enable the tag to determine whether the tag meets a random access requirement. When the RFID technology is applied to a communication network, indicating a memory bank and a mask by the reader/writer exposes memory information of the tag, and therefore, the tag may be tracked or is prone to other risks. Therefore, how to trigger a tag to perform random access in a communication network is an urgent problem to be resolved.

Based on this, embodiments of this application provide a communication method and apparatus, to resolve the problem that security is low when a tag is triggered to perform random access in a communication network. The method and the apparatus are based on a same inventive concept. Because the method and the apparatus have a similar problem-resolving principle, for implementations of the apparatus and the method, refer to each other, and no repeated description is provided.

The communication method provided in this application may be applied to various communication systems, which, for example, may be IoT, narrowband internet of things (NB-IoT), or LTE communication system, may be a 5G communication system, may be an LTE and 5G hybrid architecture, or may be a new communication system emerging in 6G or future communication development. Alternatively, the communication system may be a machine to machine (M2M) network, machine type communication (MTC), or another network. The communication system may also be a passive internet of things communication system.

For example, the communication method provided in embodiments of this application may be applied to a communication system including a reader/writer and a tag.

Figure 2:
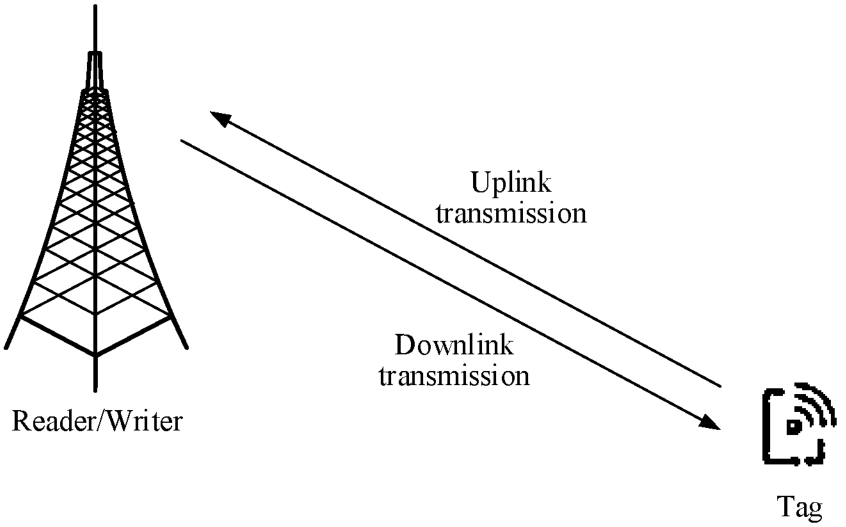
FIG. 2 is a schematic architectural diagram of a communication network system according to an embodiment of this application.

In a possible example, as shown in FIG. 2, the tag is a terminal device, and the reader/writer is an access network device. For example, the reader/writer may be a macro base station, a pole site, a micro base station, or the like. Uplink and downlink communication may be performed between the tag and the reader/writer. Transmission between the tag and the reader/writer may be Uu interface transmission, that is, air interface transmission.

Figure 3:
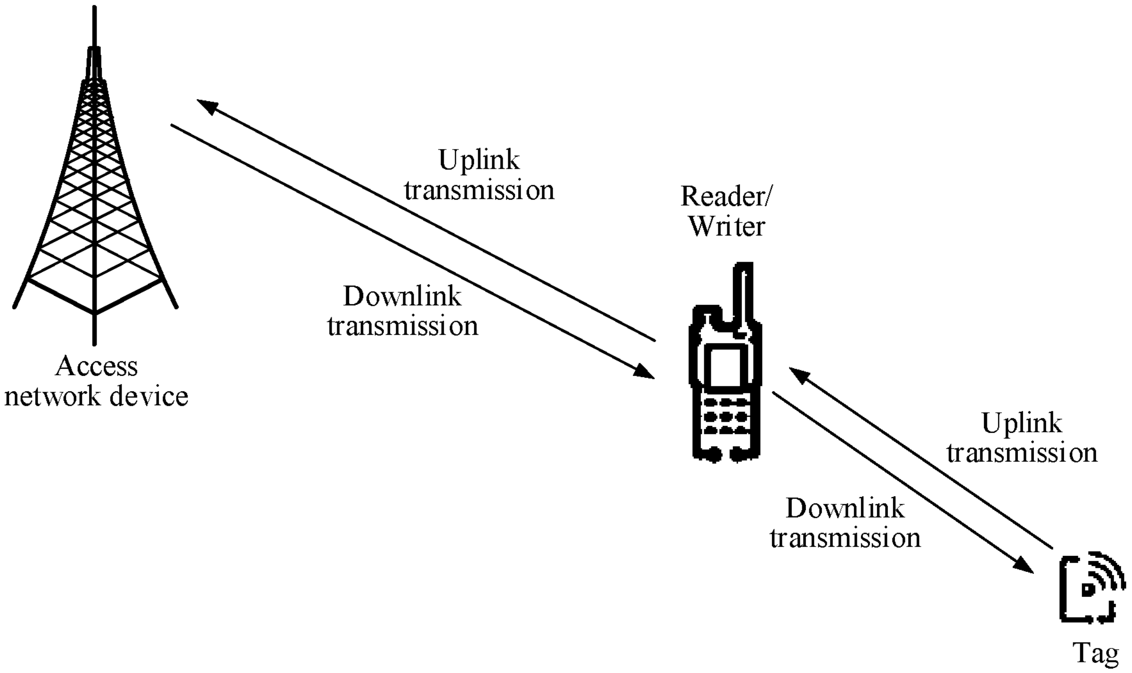
FIG. 3 is a schematic architectural diagram of a communication network system according to an embodiment of this application.
Figure 4:
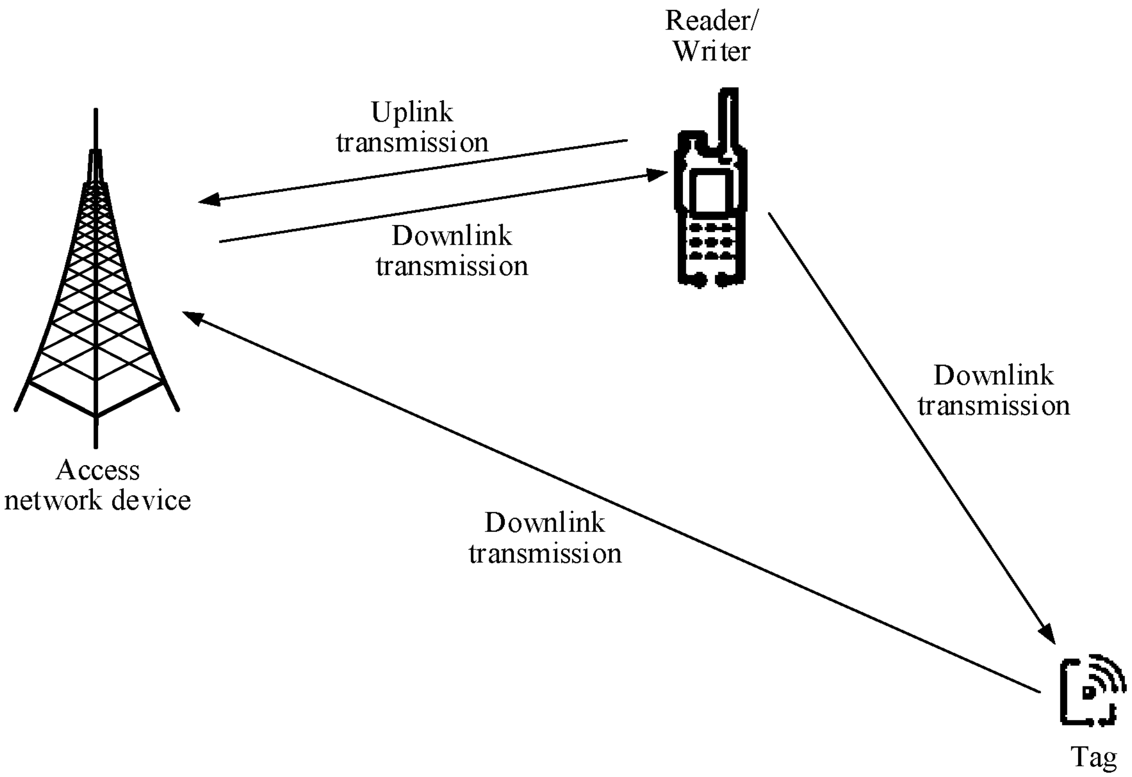
FIG. 4 is a schematic architectural diagram of a communication network system according to an embodiment of this application.

In another possible example, the tag is a terminal device, the reader/writer is a terminal device, and the reader/writer may be connected to an access network device, for example, may be connected to a macro base station, a pole station, a micro base station, or the like. Uplink and downlink communication may be performed between the reader/writer and the access network device, and uplink and downlink communication may be performed between the reader/writer and the tag, as shown in FIG. 3. Alternatively, uplink and downlink communication may be performed between the reader/writer and the access network device, downlink communication may be performed between the tag and the reader/writer, and uplink communication may be performed between the tag and the access network device, as shown in FIG. 4.

Transmission between the tag and the reader/writer may be considered as transmission between terminal devices, that is, sidelink transmission. Transmission between the reader/writer and the access network device, and between the tag and the access network device may be Uu interface transmission, that is, air interface transmission.

Embodiments of this application may also be applied to another communication system provided that the communication system includes a device that performs communication based on the RFID technology. FIG. 2 to FIG. 4 are merely schematic diagrams, and do not specifically limit a type of the communication system or a quantity, types, deployment, and the like of devices included in the communication system.

The communication method provided in embodiments of this application may be applied to industry, enterprises, agriculture, animal husbandry, forestry, and the like. In an example for description, the method may be applied to product management in industry. For example, management such as scanning and statistics collection may be automatically performed on a product by carrying a tag on the product. In another example for description, the method may be applied to device (for example, a forklift truck, a trailer, or an automated guided vehicle (AGV)) management in industry. For example, a life cycle, utilization, a location, and the like of a device may be managed by installing a tag on the device. In still another example for description, the method may be applied to breeding product (such as pigs, cattle, sheep, or chickens) management in an animal husbandry. For example, management such as statistics collection may be performed on a breeding product by fixing a tag on the breeding product. In still another example for description, the method may be applied to tree management in forestry. For example, management such as statistics collection may be performed on a tree by fixing a tag on the tree.

A network architecture and a service scenario described in embodiments of this application are intended to describe the technical solutions in embodiments of this application more clearly, and do not constitute any limitation on the technical solutions provided in embodiments of this application. A person of ordinary skill in the art may know that, with evolution of a network architecture and emergence of a new service scenario, the technical solutions provided in embodiments of this application are also applicable to a similar technical problem.

In embodiments of this application, "when . . . " may also be described as "if . . . ", "in a case in which . . . ", or the like. For example, "when the first mask matches the second mask" may also be described as "if the first mask matches the second mask", "if the first mask matches the second mask", or "in a case in which the first mask matches the second mask".

Figure 5:
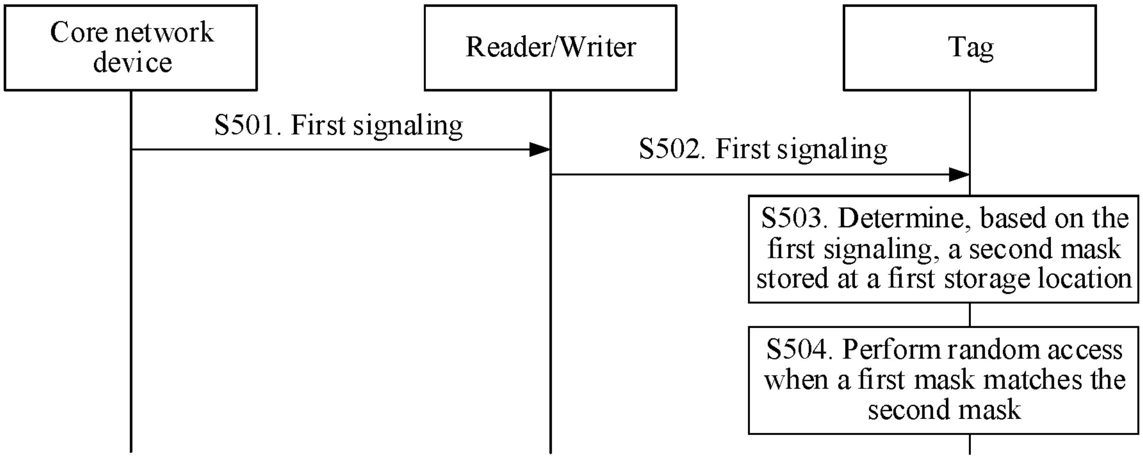
FIG. 5 is a schematic flowchart of a communication method according to an embodiment of this application.

The following describes the technical solutions in embodiments of this application with reference to the accompanying drawings in embodiments of this application. FIG. 5 is a schematic flowchart of a communication method according to this application. The method includes the following steps.

S501. A core network device sends first signaling to a reader/writer. Correspondingly, the reader/writer receives the first signaling.

The first signaling indicates a first storage location and a first mask.

In some embodiments, the core network device may receive the first signaling from an application server.

In an implementation, the first signaling may carry the first storage location and the first mask. The first signaling may carry information about a Membank and a mask, where Membank may indicate a user area, a TID area, an EPC area, and a reserved area. In addition, the first signaling may further carry other information, for example, information carried in signaling used by a reader/writer to indicate a tag to perform access in an RFID technology. Details are not described herein again.

In another implementation, the first signaling carries the first storage location and the first mask. The first storage location may be at least one of information indicating a storage area, a start location, an end location, a length, or the like. The first storage location may be encapsulated in a radio resource control (RRC) message, for example, an RRC container, and is presented in a form of a byte string or a bit string. The first mask may also be encapsulated in the RRC message, and is presented in a form of a byte string or a bit string. In addition, another feasible manner is that the first storage location and the first mask may be sent to a tag in an encrypted manner.

In another implementation, the first signaling carries a first mask identifier, and the first mask identifier identifies the first storage location and/or the first mask. In some embodiments, the first signaling may carry the first mask identifier and the first mask, and the first mask identifier identifies the first storage location. Alternatively, the first signaling may carry the first mask identifier and the first storage location, where the first mask identifier identifies the first mask. Alternatively, the first signaling may carry the first mask identifier, where the first mask identifier identifies the first mask and the first storage location.

In this manner, a storage location and/or a mask are/is implicitly indicated by using a mask identifier, so that memory information of the tag can be avoided from being exposed, and network security of the tag is improved.

It should be understood that the first mask is merely an example name of information, and the first mask may also be referred to as first mask information, a first bit string, first information, a first character string, or the like.

Optionally, when identifying the first storage location, the first mask identifier may indicate at least two of the following: start address information of a first storage area, a length of the first storage area, or end address information of the first storage area. In some embodiments, the start address information of the first storage area may indicate a start byte or a start bit of the first storage area. For example, the first mask identifier may indicate the $5^{th}$ byte in a user area, indicating that the reader/writer indicates that the $5^{th}$ byte in the user area of the tag is the start byte or the start bit of the first storage area.

When identifying the mask, the first mask identifier may further indicate the length of the second mask.

In an embodiment of this application, the reader/writer may be an access network device, as shown in FIG. 2, or may be a terminal device, as shown in FIG. 3 and FIG. 4. It should be understood that the "reader/writer" in an embodiment of this application is merely an example name. In an implementation, provided that a "reader/writer" has a function of the reader/writer described in the foregoing term introduction, the "reader/writer" may be considered as the reader/writer in an embodiment of this application.

In the architecture shown in FIG. 3 or FIG. 4, after receiving the first signaling, the core network device may send the first signaling to the reader/writer by using an access network device.

S502. The reader/writer sends the first signaling to the tag.

Correspondingly, the tag receives the first signaling.

The tag in an embodiment of this application may be a terminal device, as shown in FIG. 2, FIG. 3, and FIG. 4. It should be understood that the "tag" in an embodiment of this application is merely an example name. In an implementation, provided that a "tag" has a function of the tag described in the foregoing term introduction, the "tag" may be considered as the tag in an embodiment of this application.

In an implementation, after receiving the first signaling, the reader/writer may send the first signaling to at least one tag. For example, the reader/writer may send the first signaling to a tag in a coverage area.

S503. The tag determines, based on the first signaling, the second mask stored at the first storage location.

S504. The tag performs random access when the first mask matches the second mask.

Optionally, the tag may perform random access by using a four-step random access process, or may perform random access by using a two-step random access process. Certainly, random access may alternatively be performed by using a random access method that appears in future communication development. This is not specifically limited herein.

In an implementation, the tag may perform random access by sending a random number, or perform random access by sending identification information of the tag, for example, a temporary identifier or a unique identity. If the reader/writer successfully receives information sent by the tag, for example, a random number or an identifier, a conflict resolution process may be performed.

"The first mask matches the second mask" may mean that the first mask is consistent with the second mask, a quantity of bits that are the same in the first mask and the second mask is greater than a preset threshold, a decimal number corresponding to the first mask is greater than a decimal number corresponding to the second mask, or the like. It may be considered that the first mask matches the second mask provided that a specified matching rule is met.

In an example, if the first mask identifier may identify the first mask and the first storage location, after receiving the first signaling, if the tag can determine content (that is, the first mask and the first storage location) identified by the first mask identifier, the tag can perform random access. In this manner, if the tag pre-negotiates with the application layer server about content identified by a mask identifier, the tag may perform random access after receiving the mask identifier.

In an embodiment of this application, a part or all of masks and storage locations can be implicitly indicated by using a mask identifier, thereby avoiding exposure of information stored at a storage location in the tag, and improving network security of the tag.

In a possible implementation, before the reader/writer indicates a storage location and/or a mask based on a mask identifier, the tag may determine a correspondence between a coding identifier and a storage location, and/or determine a correspondence between a coding identifier and a mask.

The following describes two manners in which the tag determines the correspondence between the coding identifier and the storage location.

Manner 1: The tag may negotiate the correspondence between the coding identifier and the storage location with the application layer server.

For example, the tag may send a response message to the second signaling to the application server after receiving the second signaling from the application layer server. The second signaling carries N mask identifiers that include the first mask identifier, and N is an integer greater than 0. The response message to the second signaling carries N storage locations, and the N storage locations are in a one-to-one correspondence with the N mask identifiers. It may be understood that the N storage locations include the first storage location.

Optionally, the N storage locations carried in the response message to the second signaling may be in a one-to-one correspondence with the N mask identifiers based on a sequence of the N storage locations in the response message. For example, the response message sequentially carries a storage location 1, a storage location 2, a storage location 3, a storage location 4, and a storage location 5, where the storage location 1 corresponds to a coding identifier 1, the storage location 2 corresponds to a coding identifier 2, the storage location 3 corresponds to a coding identifier 3, the storage location 4 corresponds to a coding identifier 4, and the storage location 5 corresponds to a coding identifier 5.

Alternatively, the response message to the second signaling may further indicate mask identifiers respectively corresponding to the N storage locations. For example, the response message to the second signaling may further carry the N mask identifiers. In an example, the response message to the second signaling may carry: {mask identifier 1, storage location 1}, {mask identifier 2, storage location 2}, {mask identifier 3, storage location 3}, indicating that the mask identifier 1 corresponds to the storage location 1, the mask identifier 2 corresponds to the storage location 2, and the mask identifier 3 corresponds to the storage location 3.

For another example, the application layer server may send third signaling to the tag, where the third signaling carries K mask identifiers and K storage locations, the K storage locations are in a one-to-one correspondence with the K mask identifiers, the K mask identifiers include the first mask identifier, and K is an integer greater than 0. In an example, the third signaling may carry: {mask identifier 1, storage location 1}, {mask identifier 2, storage location 2}, {mask identifier 3, storage location 3}, indicating that the mask identifier 1 corresponds to the storage location 1, the mask identifier 2 corresponds to the storage location 2, and the mask identifier 3 corresponds to the storage location 3. It may be understood that the K storage locations include the first storage location.

Optionally, after receiving the third signaling, the tag may send a response message to the third signaling to the application layer server.

Optionally, before receiving the second signaling (or the third signaling), the tag may send a negotiation request message to the application layer server, to request to negotiate the correspondence between the mask identifier and the storage location.

Manner 2: A correspondence between the first mask identifier and the first storage location may be preset. For example, the correspondence between the mask identifier and the storage location may be set in factory settings of the tag. Optionally, in the manner 2, the correspondence between the first mask identifier and the first storage location may not remain unchanged after being preset, that is, the correspondence between the mask identifier and the storage location may also be changed. For example, the correspondence between the mask identifier and the storage location may be renegotiated in the foregoing manner 1. Alternatively, the correspondence between the first mask identifier and the first storage location may be specified in a protocol.

In the foregoing manner 2, the tag and the application layer server may not need to negotiate the correspondence between the mask identifier and the storage location, thereby reducing implementation complexity of the tag. For example, the manner 2 may be applicable to a passive tag application scenario.

The foregoing describes the correspondence between the mask identifier and the storage location. The following describes two manners in which the tag determines the correspondence between the mask identifier and the mask.

Manner 3: The tag may negotiate the correspondence between the mask identifier and the mask with the application layer server.

For example, the tag may send a response message to the fourth signaling to the application server after receiving fourth signaling from the application layer server. The fourth signaling carries M mask identifiers including the first mask identifier, and M is an integer greater than 0. The response message to the fourth signaling carries M masks, and the M masks are in a one-to-one correspondence with the M mask identifiers. It may be understood that the M masks include the first mask.

Optionally, the M masks carried in the response message to the fourth signaling may be in a one-to-one correspondence with the M mask identifiers based on a sequence of the M masks in the response message. For example, the response message sequentially carries a mask 1, a mask 2, a mask 3, a mask 4, and a mask 5. The mask 1 corresponds to a coding identifier 1, the mask 2 corresponds to a coding identifier 2, the mask 3 corresponds to a coding identifier 3, the mask 4 corresponds to a coding identifier 4, and the mask 5 corresponds to a coding identifier 5.

Alternatively, the response message to the fourth signaling may further indicate mask identifiers respectively corresponding to the M storage locations. For example, the response message to the fourth signaling may further carry M mask identifiers. In an example, the response message to the fourth signaling may carry {mask identifier 1, mask 1}, {mask identifier 2, mask 2}, and {mask identifier 3, mask 3}, indicating that the mask identifier 1 corresponds to the mask 1, the mask identifier 2 corresponds to the mask 2, and the mask identifier 3 corresponds to the mask 3.

For another example, the application layer server may send fifth signaling to the tag, where the fifth signaling carries L mask identifiers and L masks, the L masks are in a one-to-one correspondence with the L mask identifiers, the L mask identifiers include the first mask identifier, and L is an integer greater than 0. In an example, the fifth signaling may carry {mask identifier 1, mask 1}, {mask identifier 2, mask 2}, and {mask identifier 3, mask 3}, indicating that the mask identifier 1 corresponds to the mask 1, the mask identifier 2 corresponds to the mask 2, and the mask identifier 3 corresponds to the mask 3. It may be understood that the L masks include the first mask.

Optionally, after receiving the fifth signaling, the tag may send a response message to the fifth signaling to the application layer server.

Manner 4: A correspondence between the first mask identifier and the first mask may be preset. For example, the correspondence between the mask identifier and the mask may be set in factory settings of the tag. Optionally, in the manner 2, the correspondence between the first mask identifier and the first mask may not remain unchanged after being preset, that is, the correspondence between the mask identifier and the mask may also be changed. For example, the correspondence between the mask identifier and the mask may be renegotiated in the foregoing manner 1. Alternatively, the correspondence between the first mask identifier and the first mask may be specified in a protocol.

In the foregoing manner 4, the tag and the application layer server may not need to negotiate the correspondence between the mask identifier and the mask, thereby reducing implementation complexity of the tag. For example, the manner 4 may be applicable to a passive tag application scenario.

The method described in the foregoing manner 1 and/or manner 3 may be performed after the tag is registered with a core network, so that the tag and the application layer server may negotiate, based on an encrypted session, the correspondence between the mask identifier and the storage location and/or the correspondence between the mask identifier and the mask. In the foregoing manners, the tag and the application layer server negotiate the correspondence between the mask identifier and the storage location and/or the correspondence between the mask identifier and the mask based on the encrypted session. This can avoid exposure of information identified by a mask identifier, thereby improving security when the reader/writer indicates the tag to perform random access.

The foregoing describes a method for determining the correspondence between the mask identifier and the storage location and a method for determining the correspondence between the mask identifier and the mask. In a solution in which a mask identifier identifies a storage location, the tag may determine the correspondence between the mask identifier and the storage location in either the manner 1 or the manner 2. In a solution in which a mask identifier identifies a mask, the tag may determine the correspondence between the mask identifier and the mask in either the manner 3 or the manner 4. In a solution in which a mask identifier identifies a storage location and a mask, the tag may determine the correspondence between the mask identifier and the storage location in either the manner 1 or the manner 2, and determine the correspondence between the mask identifier and the mask in either the manner 3 or the manner 4.

Figure 6:
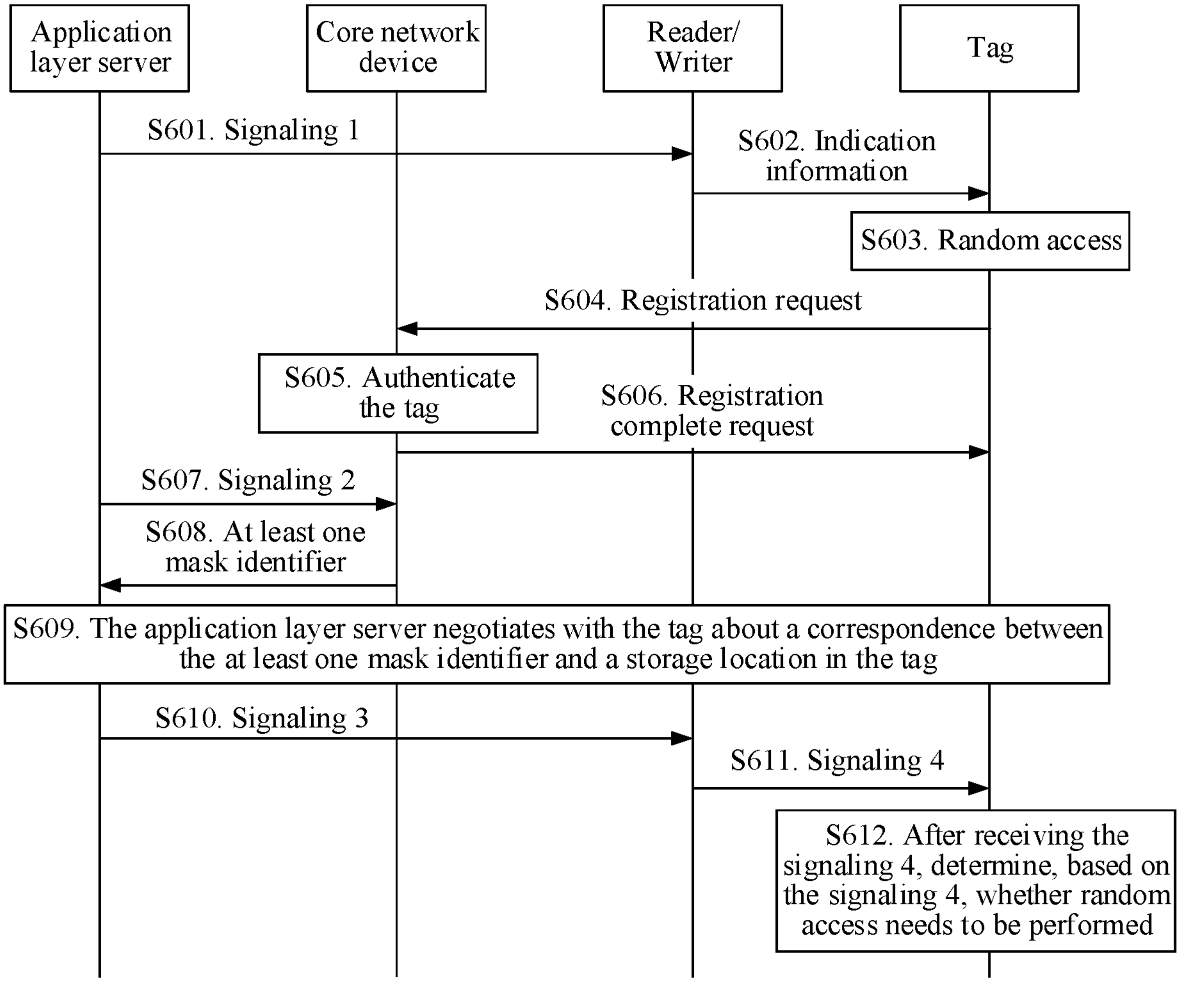
FIG. 6 is a schematic flowchart of random access performed by a tag according to an embodiment of this application.

For ease of understanding of the solution, the following describes, by using an example in which a mask identifier identifies a storage location, a process in which a reader/writer selects a tag for random access. As shown in FIG. 6, a process of selecting, by a reader/writer, a tag for random access includes the following steps.

S601. An application layer server sends signaling 1 to a reader/writer. The signaling 1 indicates a tag to perform random access.

It should be noted that, in step S601, only a transmitting end of the signaling 1, that is, the application layer server, and a receiving end of the signaling 1, that is, the reader/writer, are described. It should be understood that when sending the signaling 1 to the reader/writer, the application layer server may send the signaling 1 to the reader/writer by using another communication device. For example, the application layer server may send the signaling 1 to the reader/writer by using a core network device, an access network device, or the like. For example, in the communication system shown in FIG. 2, the application layer server may send signaling 1 to the reader/writer by using the core network device. In the communication systems shown in FIG. 3 and FIG. 4, the application layer server may send the signaling 1 to the reader/writer by using the core network device and the access network device.

S602. The reader/writer sends indication information to the tag, where the indication information indicates the tag to perform random access.

In an implementation, the reader/writer may send the indication information to an unregistered tag, or may send the indication information to an unregistered tag that meets a preset rule. For example, the preset rule may include at least one of the following: A mask sent by the reader/writer matches a mask of the tag, a flag bit indicated by the reader/writer matches a flag bit of the tag, or a prefix sent by the reader/writer matches information identified or stored by the tag.

S603. The tag initiates random access.

Optionally, the tag may perform random access by using a four-step random access process, or may perform random access by using a two-step random access process. Certainly, random access may alternatively be performed by using a random access method that appears in future communication development. This is not specifically limited herein.

In an implementation, the tag may perform random access by sending a random number, or perform random access by sending identification information of the tag, for example, a temporary identifier or a unique identity. If the reader/writer successfully receives the information sent by the tag, a conflict resolution process may be performed.

S604. The tag sends a registration request to the core network device, where the registration request is for requesting to register with a core network.

S605. The core network device authenticates the tag.

S606. After the authentication succeeds, the core network device sends a registration complete message to the tag. The registration complete message may also be referred to as a registration accept message, and is merely an example name herein.

It should be noted that steps S601 to S606 may be optional steps.

S607. The application server sends signaling 2 to the core network device, where the signaling 2 is for requesting the core network device to allocate a mask identifier.

S608. The core network device sends at least one mask identifier to the application layer server.

It should be noted that steps S607 and S608 may be optional steps.

In an implementation, only S608 may be performed, and S607 is not performed. In other words, the core network device may actively send the at least one mask identifier to the application layer server.

S609. The application layer server negotiates with the tag about a correspondence between the at least one mask identifier and a storage location in the tag.

For an example process, refer to the foregoing manner 1. Details are not described herein again.

In a possible implementation, S609 may not be performed. For example, the correspondence between the at least one mask identifier and the storage location in the tag may be preset.

It may be understood that, after the tag is registered with the core network, the tag and the application layer server may communicate based on an encrypted session. If the application layer server and the tag negotiate the correspondence between the mask identifier and the storage location in the tag, when the tag is disconnected from the reader/writer, an application layer may use the mask identifier to indicate the tag to perform random access.

That the application layer uses the mask identifier to indicate the tag to perform random access may be described in steps S610 to S612.

S610. The application layer server sends signaling 3 to the reader/writer, where the signaling 3 carries a first mask identifier and a first mask.

In an implementation, the application layer server may send the signaling 3 to the core network device, and then the core network device sends the signaling 3 to the access network device. After receiving the signaling 3, the access network device sends the signaling 3 to the reader/writer. For example, in the method, the reader/writer may be a terminal device. For example, the method may be applied to the communication architectures shown in FIG. 3 and FIG. 4.

In another implementation, the application layer server may send the signaling 3 to the core network device, and the core network device sends the signaling 3 to the reader/writer after receiving the signaling 3. For example, in the method, the reader/writer may be an access network device. For example, the method may be applied to the communication architecture shown in FIG. 2.

S611. The reader/writer sends signaling 4 to the tag, where the signaling 4 carries the first mask identifier and the first mask.

The signaling 4 may be the signaling 3. In other words, the reader/writer forwards the signaling 3 from the application layer server to the tag. Alternatively, the signaling 4 may be generated based on the signaling 3. For example, after receiving the signaling 3, the reader/writer generates the signaling 4 that carries the first mask identifier and the first mask.

For example, the signaling 4 may be a select command, a paging command, or the like.

Optionally, the signaling 4 may further carry other information, for example, a group identifier of a tag and a flag bit corresponding to the group identifier.

In an implementation, the reader/writer may send the signaling 4 to a tag within a coverage area of the reader/writer.

S612. After receiving the signaling 4, the tag determines, based on the signaling 4, whether random access needs to be performed.

In an implementation, the tag may determine, based on a negotiation result in S609, a storage location corresponding to the first mask identifier, then determine a second mask stored at the storage location, and compare the second mask with the first mask. If the second mask matches the first mask, it may be determined that random access is required.

Further, if the signaling 4 further includes the group identifier and the flag bit, before it is determined that random access is required, it may be further determined that a group identifier of the tag is consistent with the group identifier carried in the signaling 4, and flag bits are also consistent.

Optionally, if at least one of the following conditions is met, it is determined that random access does not need to be performed: The second mask does not match the first mask, the group identifier of the tag is inconsistent with the group identifier carried in the signaling 4, or the flag bits are inconsistent.

Figure 7:
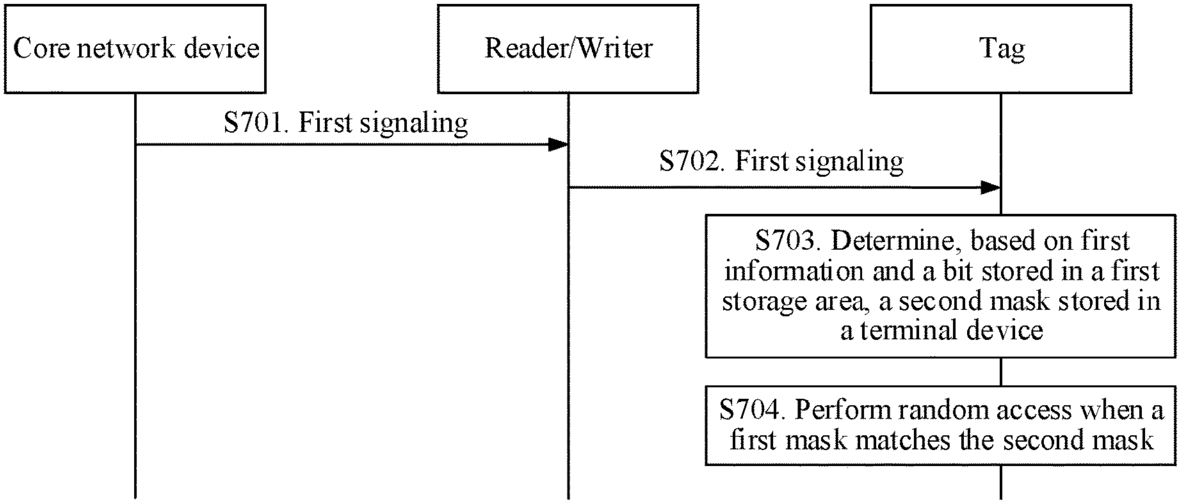
FIG. 7 is a schematic flowchart of a communication method according to an embodiment of this application.

FIG. 7 is a schematic flowchart of a communication method according to this application. The method includes the following steps.

S701. A core network device sends first signaling to a reader/writer. Correspondingly, the reader/writer receives the first signaling.

The first signaling carries a first mask and first information, the first information indicates a bit used as a mask in L bits stored in a first storage area, the first storage area is a preset storage area in a storage area of a terminal device, and L is an integer greater than 1.

In some embodiments, the core network device may receive the first signaling from an application server.

In an embodiment of this application, the reader/writer may be an access network device, as shown in FIG. 2, or may be a terminal device, as shown in FIG. 3 and FIG. 4. It should be understood that the "reader/writer" in an embodiment of this application is merely an example name. In an implementation, provided that a "reader/writer" has a function of the reader/writer described in the foregoing term introduction, the "reader/writer" may be considered as the reader/writer in an embodiment of this application.

In the architecture shown in FIG. 3 or FIG. 4, after receiving the first signaling, the core network device may send the first signaling to the reader/writer by using an access network device.

The first storage area may be a preset storage area in a storage area of a tag. For example, the first storage area may be a storage area opened by the tag, and the storage area may be visible to both an application layer and a core network element. The reader/writer may indicate any storage location of the tag and a mask stored at the storage location. In this case, the storage area of the tag is completely open. In an embodiment of this application, a storage area (that is, the first storage area) is opened, and mask information is indicated in the first storage area, so that the entire storage area of the tag can be avoided from being exposed, thereby improving transmission security.

In a possible implementation, the first storage area may support a rewrite operation of the reader/writer, so that different tags can be flexibly selected.

In an example, the first information may be an m-bit bitmap, the bitmap indicates whether m bit groups included in the L bits are used as masks, one bit in the bitmap indicates whether one bit group is used as a mask, and m is an integer greater than 1 and less than L.

For example, L=m*k. Here, k bits are used as a group, and there are m groups in total. The reader/writer sends an m-bit bitmap to the tag. If a bit is 1, it indicates that a bit group is used as a mask; and if the bit is 0, it indicates that the bit group is not used as a mask. Alternatively, if a bit is 0, it indicates that a bit group is used as a mask; and if the bit is 1, it indicates that the bit group is not used as a mask. In an implementation, the $1^{st}$ bit in the bitmap may correspond to the $1^{st}$ bit group, the $2^{nd}$ bit in the bitmap may correspond to the $2^{nd}$ bit group, and so on.

Optionally, the reader/writer may further indicate, to the tag, a bit state indicating that a bit group is used as a mask. For example, a bit state indicating that a bit group is used as a mask is 1. In other words, when a bit is 1, it indicates that a bit group serves as a mask.

Alternatively, the bit status indicating that the bit group is used as the mask may be preset, for example, may be set in factory settings of the tag.

Figure 8:
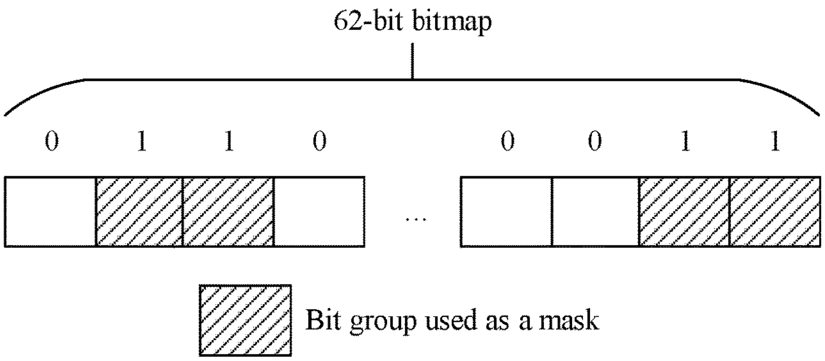
FIG. 8 is a schematic diagram of indicating a mask by using a bitmap according to an embodiment of this application.

For example, it is assumed that L=496, m=62, and k=8. The reader/writer may send a 62-bit bitmap and a mask to the tag, where the bitmap indicates which bit groups are used as masks, and the mask is a bit group corresponding to a bit whose state is 1 in the bitmap, as shown in FIG. 8.

In another example, the first information may indicate that a start location of a second mask is a first bit location in the L bits; the first information indicates that a start location of a second mask is a first byte location in the L bits; or the first information indicates that a start location of a second mask is located in a first bit group in the L bits. For example, the L bits include m bit groups, and the first information may indicate a group number of the first bit group.

In still another example, a start location of a second mask in the first storage area may alternatively be a default location. In this example, the first signaling may not carry the first information.

In still another example, the first information may be an M-bit bitmap, where the bitmap indicates whether M bits in the L bits are used as masks, and one bit in the bitmap indicates whether one bit in the M bits is used as a mask.

For example, assuming that M is equal to L, the first information may be an L-bit bitmap, where the bitmap indicates whether the L bits are used as masks, and one bit in the bitmap indicates whether one bit in the L bits is used as a mask. For example, assuming that L is equal to 10, the first information may be a 10-bit bitmap, where the bitmap indicates whether the 10 bits are used as masks.

For another example, assuming that M is less than L, the first information may be an M-bit bitmap. The bitmap indicates whether M bits starting from a second bit location in the L bits are used as masks, and one bit in the bitmap indicates whether one bit in the M bits starting from the second bit location is used as a mask. For example, assuming that L is equal to 10 and M is equal to 5, the first information may be a 5-bit bitmap. The bitmap indicates whether five bits starting from the $3^{rd}$ bit in the 10 bits are used as masks, in other words, indicates whether the $3^{rd}$ to the $7^{th}$ bits in the 10 bits are used as masks. Optionally, the second bit location may be preset or pre-negotiated, or may be indicated by the first information.

Optionally, the first signaling may further indicate a length of the second mask.

In an implementation, the application layer server may send the first signaling to the core network device, and the core network device may send the first signaling to the reader/writer by using a user plane or a control plane. For example, the first signaling may be included in an NG interface (an interface between an AMF and the access network device) message, a non-access stratum (NAS) message, or user data from a UPF to the access network device.

S702. The reader/writer sends the first signaling to the tag. Correspondingly, the tag receives the first signaling.

The tag in an embodiment of this application may be a terminal device, as shown in FIG. 2, FIG. 3, and FIG. 4. It should be understood that the "tag" in an embodiment of this application is merely an example name. In an implementation, provided that a "tag" has a function of the tag described in the foregoing term introduction, the "tag" may be considered as the tag in an embodiment of this application.

In an implementation, after receiving the first signaling, the reader/writer may send the first signaling to at least one tag. For example, the reader/writer may send the first signaling to a tag in a coverage area.

S703. The tag determines, based on the first information and a bit stored in the first storage area, the second mask stored in the terminal device.

S704. The tag performs random access when the first mask matches the second mask.

Optionally, the tag may perform random access by using a four-step random access process, or may perform random access by using a two-step random access process. Certainly, random access may alternatively be performed by using a random access method that appears in future communication development. This is not specifically limited herein.

In an implementation, the tag may perform random access by sending a random number, or perform random access by sending identification information of the tag, for example, a temporary identifier or a unique identity. If the reader/writer successfully receives information sent by the tag, a conflict resolution process may be performed.

"The first mask matches the second mask" may mean that the first mask is consistent with the second mask and a third mask, a quantity of bits that are the same in the first mask and the second mask is greater than a threshold, a decimal number corresponding to the first mask is greater than a decimal number corresponding to the second mask, or the like. It may be considered that the first mask matches the second mask provided that a specified matching rule is met.

In an embodiment of this application, a mask is indicated by using a fixed storage area, to avoid exposure of the entire storage area of a tag, thereby improving network security of the tag. In addition, a bit in the fixed storage area can be flexibly selected as a mask by using the first information, so that a tag can be flexibly selected to access a reader/writer.

Figure 9:
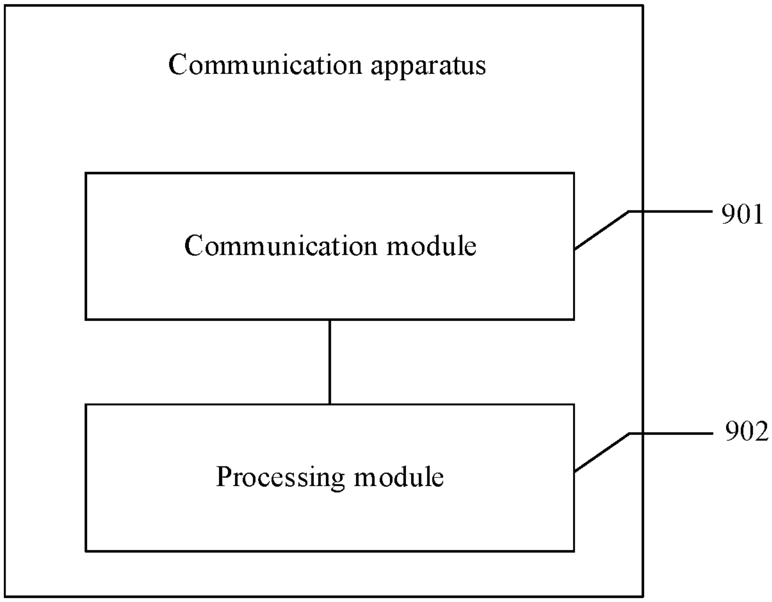
FIG. 9 is a schematic diagram of a structure of a communication apparatus according to an embodiment of this application.

Based on a same concept as the method embodiments, an embodiment of this application provides a communication apparatus. A structure of the communication apparatus may be shown in FIG. 9, and the communication apparatus includes a communication module 901 and a processing module 902.

In an implementation, the communication apparatus may be configured to implement the method performed by the tag in the embodiment in FIG. 5. The apparatus may be the tag itself, a chip or a chip set in the tag, or a part of the chip that is configured to perform a related method function. The communication module 901 is configured to receive first signaling, where the first signaling indicates a first storage location and a first mask, the first signaling carries a first mask identifier, and the first mask identifier identifies the first storage location and/or the first mask. The processing module 902 is configured to: determine, based on the first signaling, a second mask stored at the first storage location; and perform random access by using the communication module 901 when the first mask matches the second mask.

Optionally, the communication module 901 is further configured to: before receiving the first signaling, receive second signaling from an application layer server, where the second signaling carries N mask identifiers that include the first mask identifier, and N is an integer greater than 0; and send a response message to the second signaling to the application server, where the response message carries N storage locations, and the N storage locations are in a one-to-one correspondence with the N mask identifiers.

Optionally, the communication module 901 is further configured to: before receiving the first signaling, receive third signaling from an application layer server, where the third signaling carries K mask identifiers and K storage locations, the K storage locations are in a one-to-one correspondence with the K mask identifiers, the K mask identifiers include the first mask identifier, and K is an integer greater than 0.

Optionally, the communication module 901 is further configured to: before receiving the first signaling, receive fourth signaling from the application layer server, where the fourth signaling carries M mask identifiers that include the first mask identifier, and M is an integer greater than 0; and send a response message to the fourth signaling to the application server, where the response message carries M masks, and the M masks are in a one-to-one correspondence with the M mask identifiers.

Optionally, the communication module 901 is further configured to: before receiving the first signaling, receive fifth signaling from the application layer server, where the fifth signaling carries L mask identifiers and L masks, the L masks are in a one-to-one correspondence with the L mask identifiers, the L mask identifiers include the first mask identifier, and L is an integer greater than 0.

In an implementation, the communication apparatus may be configured to implement the method performed by the tag in the embodiment in FIG. 7. The apparatus may be the tag itself, a chip or a chip set in the tag, or a part of the chip that is configured to perform a related method function. The communication module 901 is configured to receive first signaling, where the first signaling carries a first mask and first information, the first information indicates a bit used as a mask in L bits stored in a first storage area, the first storage area is a preset storage area in a storage area of the terminal device, and L is an integer greater than 1. The processing module 902 is configured to: determine, based on the first information and the bits stored in the first storage area, a second mask stored in the terminal device; and perform random access by using the communication module 901 when the first mask matches the second mask.

Figure 10:
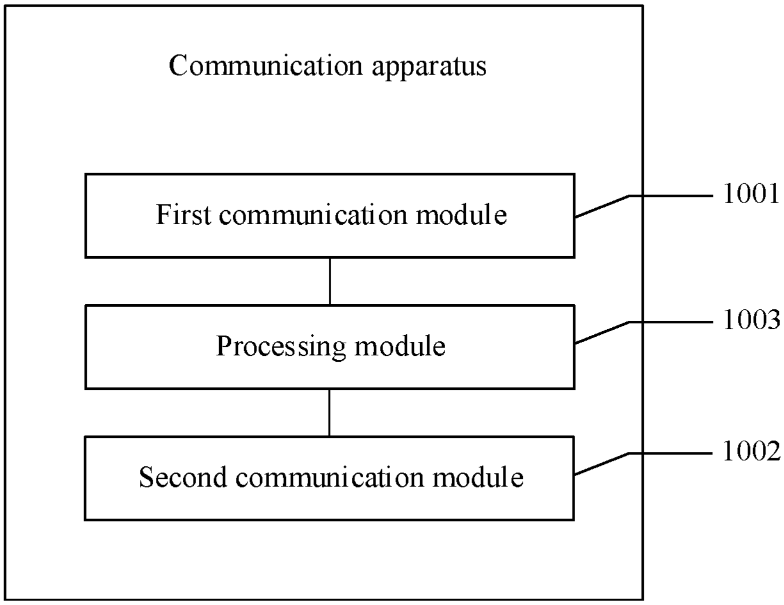
FIG. 10 is a schematic diagram of a structure of a communication apparatus according to an embodiment of this application.

An embodiment of this application further provides another communication apparatus. A structure of the communication apparatus may be shown in FIG. 10, and the communication apparatus includes a first communication module 1001, a second communication module 1002, and a processing module 1003.

In an implementation, the communication apparatus may be configured to implement the method performed by the reader/writer in the embodiment in FIG. 5. The apparatus may be the reader/writer itself, a chip or a chip set in the reader/writer, or a part of the chip that is configured to perform a related method function. The first communication module 1001 is configured to communicate with an application layer server. The second communication module 1002 is configured to communicate with a terminal device. The processing module 1003 is configured to: receive first signaling from the application layer server by using the first communication module 1001, where the first signaling indicates a first storage location and a first mask, the first signaling carries a first mask identifier, and the first mask identifier identifies the first storage location and/or the first mask; and send the first signaling to at least one terminal device by using the second communication module 1002.

In an implementation, the communication apparatus may be configured to implement the method performed by the reader/writer in the embodiment in FIG. 5. The apparatus may be the reader/writer itself, a chip or a chip set in the reader/writer, or a part of the chip that is configured to perform a related method function. The first communication module 1001 is configured to communicate with an application layer server. The second communication module 1002 is configured to communicate with a terminal device. The processing module 1003 is configured to: receive first signaling from the application layer server by using the first communication module 1001, where the first signaling carries information about a first storage location and a first mask; and send the first signaling to at least one terminal device by using the second communication module 1002.

In an implementation, the communication apparatus may be configured to implement the method performed by the reader/writer in the embodiment in FIG. 7. The apparatus may be the reader/writer itself, a chip or a chip set in the reader/writer, or a part of the chip that is configured to perform a related method function. The first communication module 1001 is configured to communicate with an application layer server. The second communication module 1002 is configured to communicate with a terminal device. The processing module 1003 is configured to: receive first signaling from the application layer server by using the first communication module 1001, where the first signaling carries a first mask and first information, the first information indicates a bit used as a mask in L bits stored in a first storage area, the first storage area is a preset storage area in a storage area of the terminal device, and L is an integer greater than 1; and send the first signaling to at least one terminal device by using the second communication module 1002.

Division into the modules in embodiments of this application is used as an example, and there may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module. It may be understood that for functions or implementations of the modules in embodiments of this application, further refer to related descriptions in the method embodiments.

Figure 11:
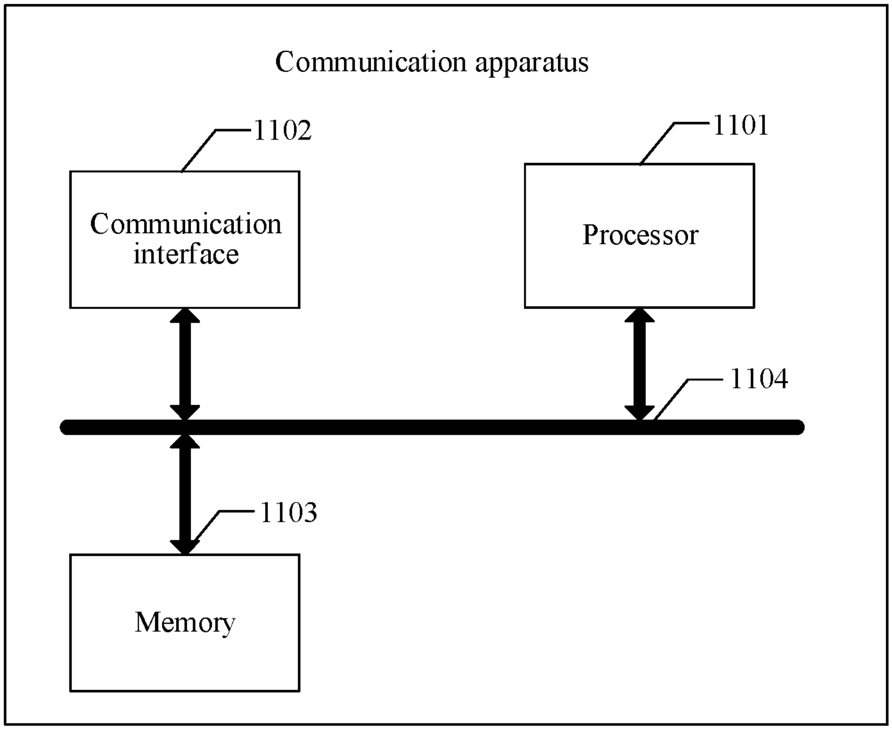
FIG. 11 is a schematic diagram of a structure of a communication apparatus according to an embodiment of this application.

In a possible implementation, a communication apparatus may be shown in FIG. 11, and the apparatus may be a tag or a chip in the tag. The apparatus includes a processor 1101 and a communication interface 1102, and may further include a memory 1103. The processing module 902 may be the processor 1101. The communication module 901 may be the communication interface 1102.

The processor 1101 may be a central processing unit (CPU), a digital processing unit, or the like. The communication interface 1102 may be a transceiver, an interface circuit like a transceiver circuit, a transceiver chip, or the like. The apparatus further includes the memory 1103, configured to store a program executed by the processor 1101. The memory 1103 may be a non-volatile memory such as a hard disk drive (HDD) or a solid-state drive (SSD), or may be a volatile memory such as a random access memory (RAM). The memory 1103 is any other medium that can be used to carry or store expected program code in a form of an instruction or a data structure and that can be accessed by a computer, but is not limited thereto.

The processor 1101 is configured to execute the program code stored in the memory 1103, and is configured to perform an action of the processing module 902. Details are not described herein in this application. The communication interface 1102 is configured to perform an action of the communication module 901. Details are not described herein again in this application.

A specific connection medium between the communication interface 1102, the processor 1101, and the memory 1103 is not limited in embodiments of this application. In some embodiments of this application, the memory 1103, the processor 1101, and the communication interface 1102 are connected through a bus 1104 in FIG. 11. The bus is represented by using a bold line in FIG. 11. A manner of a connection between other components is merely an example for description, and is not limited thereto. The bus may be classified into an address bus, a data bus, a control bus, and the like. For ease of representation, only one bold line is used to represent the bus in FIG. 11, but this does not mean that there is only one bus or only one type of bus.

Figure 12:
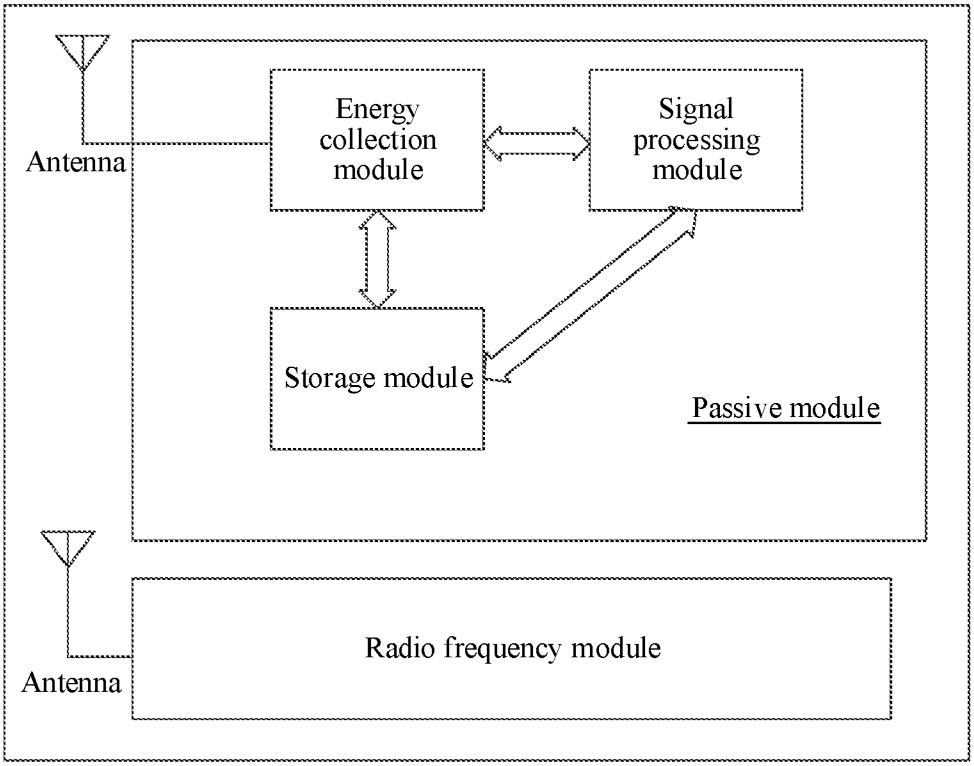
FIG. 12 is a schematic diagram of a structure of a terminal device according to an embodiment of this application.

FIG. 12 is a schematic diagram of a structure of a tag according to an embodiment of this application. The terminal device has a tag function. In FIG. 12, the terminal device includes modules such as a passive module, a radio frequency module, and an antenna. The radio frequency module can process a signal in a cellular communication system such as an NR system and an LTE system, or may process a signal in a wireless local area network of the institute of electrical and electronics engineers (IEEE) 802.11 series. The radio frequency module may include a radio frequency front-end component, a radio frequency integrated circuit (RFIC), and the like. This is not specifically limited.

In some embodiments of this application, the passive module may be divided into a plurality of modules based on functions, for example, including an energy collection module, a signal processing module (or referred to as a protocol stack processing module), and a storage module. The energy collection module may convert a radio signal received by using the antenna into energy, and provide the energy for the signal processing module. The energy collection module may include a coupling element, for example, a coil or a microstrip antenna. The signal processing module may be driven to work by using the energy provided by the energy collection module, to perform processing such as decoding and demodulation on the radio signal. The storage module may store information such as an identifier of the terminal device. This is not specifically limited. It should be noted that the foregoing division into modules is merely an example, and may be adjusted based on an actual situation in actual application. Implementation of a specific circuit of the foregoing modules is not limited in embodiments of this application.

It should be noted that, the radio signal is converted into the energy by mainly using an electromagnetic conversion principle. When receiving an electromagnetic wave (that is, the radio signal) by using the antenna, the passive module of the terminal device generates an induced current, to obtain the energy. The passive module may obtain the energy from the radio signal through electromagnetic coupling and/or inductive coupling. For example, the energy collection module in the radio module may include an electromagnetic coupling circuit. When the radio signal passes through the coupling circuit, the induced current is generated, to obtain the energy.

The passive module may be classified into a non-energy storage type, an energy storage type, and a semi-active circuit. The non-energy storage type means that the passive module works while collecting energy by using the energy collection module. The energy storage type means that the passive module may collect energy for a period of time by using the energy collection module, and then use the energy to work. Compared with the non-energy storage type, a passive circuit of the energy storage type may have higher working power and can perform more complex protocol processing, but has lower data transmission efficiency. The semi-active circuit requires the terminal device to provide a small part of electric energy, to improve working efficiency of the passive module. It should be noted that a type of the passive module is not limited in this application.

Figure 13:
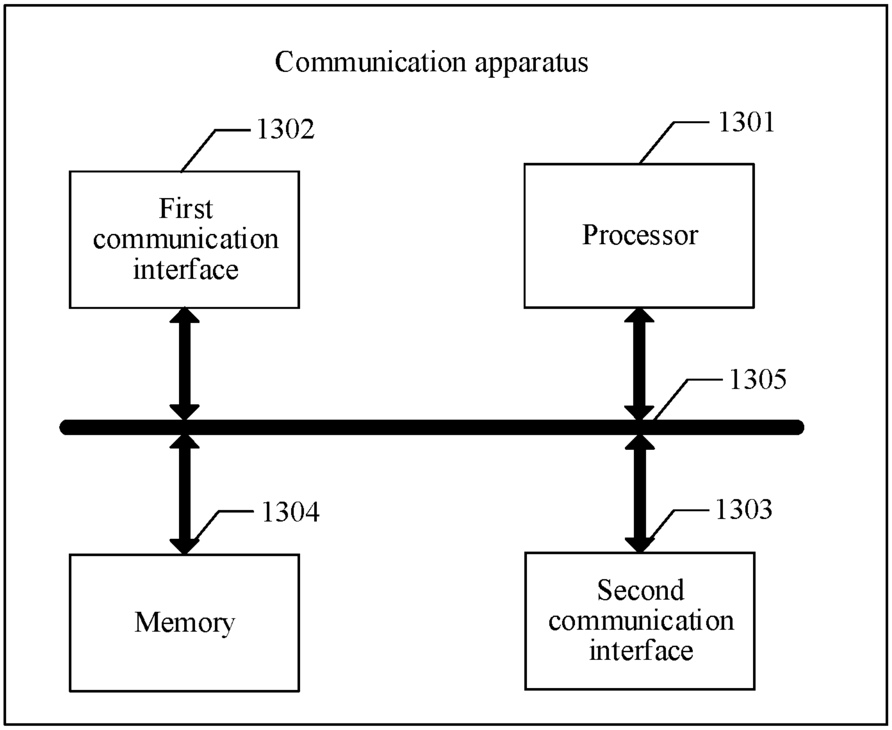
FIG. 13 is a schematic diagram of a structure of a communication apparatus according to an embodiment of this application.

In another possible implementation, the communication apparatus may be shown in FIG. 13. The apparatus may be a reader/writer or a chip in the reader/writer. The apparatus includes a processor 1301, a first communication interface 1302, and a second communication interface 1303, and may further include a memory 1304. The processing module 1003 may be the processor 1301. The first communication module 1001 may be the first communication interface 1302. The second communication module 1002 may be the second communication interface 1303. The first communication interface 1302 and the second communication interface 1303 may be a same communication interface, or may be different communication interfaces.

The processor 1301 may be a CPU, a digital processing unit, or the like. The first communication interface 1302 and the second communication interface 1303 may be transceivers, interface circuits such as transceiver circuits, transceiver chips, or the like. The apparatus further includes the memory 1304, configured to store a program executed by the processor 1301. The memory 1304 may be a non-volatile memory such as an HDD or an SSD, or may be a volatile memory such as a RAM. The memory 1304 is any other medium that can be used to carry or store expected program code in a form of an instruction or a data structure and that can be accessed by a computer, but is not limited thereto.

The processor 1301 is configured to execute the program code stored in the memory 1304, and is configured to perform an action of the processing module 1003. Details are not described herein in this application. The first communication interface 1302 is configured to perform an action of the first communication module 1001, and the second communication interface 1303 is configured to perform an action of the second communication module 1002. Details are not described herein again in this application.

A specific connection medium between the first communication interface 1302, the second communication interface 1303, the processor 1301, and the memory 1304 is not limited in embodiments of this application. In some embodiments of this application, the memory 1304, the processor 1301, the first communication interface 1302, and the second communication interface 1303 are connected through a bus 1305 in FIG. 13. The bus is represented by using a bold line in FIG. 13. A manner of a connection between other components is merely an example for description, and is not limited thereto. The bus may be classified into an address bus, a data bus, a control bus, and the like. For ease of representation, only one bold line is used to represent the bus in FIG. 13, but this does not mean that there is only one bus or only one type of bus.

An embodiment of this application further provides a computer-readable storage medium, configured to store computer software instructions that need to be performed by the foregoing processor, and the computer software instructions include a program that needs to be performed by the foregoing processor.

An embodiment of this application further provides a communication system, including a communication apparatus configured to implement a tag function in the embodiment in FIG. 5 and a communication apparatus configured to implement a reader/writer function in the embodiment in FIG. 5. Optionally, the system may further include a communication apparatus configured to implement an application layer server function in the embodiment in FIG. 5.

An embodiment of this application further provides a communication system, including a communication apparatus configured to implement a terminal device function in the embodiment in FIG. 7 and a communication apparatus configured to implement a network device function in the embodiment in FIG. 7. Optionally, the system may further include a communication apparatus configured to implement an application layer server function in the embodiment in FIG. 7.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a compact disc read-only memory (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

These computer program instructions may be stored in a computer-readable memory that can instruct the computer or any other programmable data processing device to perform work, so that the instructions stored in the computer-readable memory generate an artifact that includes an instruction apparatus. The instruction apparatus implements a function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

What is claimed is:

1. A communication method, wherein the method is applied to a terminal device, and the method comprises:

receiving first signaling, wherein the first signaling indicates a first storage location and a first mask, the first signaling carries a first mask identifier, and the first mask identifier identifies at least one of the first storage location or the first mask;

determining, based on the first signaling, a second mask stored at the first storage location; and performing random access when the first mask matches the second mask, wherein before the receiving first signaling, the method further comprises:

receiving second signaling, wherein the second signaling carries N mask identifiers that comprise the first mask identifier, and N is an integer greater than 0; and sending a response message to the second signaling, wherein the response message carries N storage locations, and the N storage locations are in a one-to-one correspondence with the N mask identifiers.

2. The method according to claim 1, wherein a correspondence between the first mask identifier and the first storage location is preset.

3. The method according to claim 1, wherein before the receiving first signaling, the method further comprises:

receiving fourth signaling, wherein the fourth signaling carries M mask identifiers that comprise the first mask identifier, and M is an integer greater than 0; and sending a response message to the fourth signaling, wherein the response message carries M masks, and the M masks are in a one-to-one correspondence with the M mask identifiers.

4. The method according to claim 1, wherein before the receiving first signaling, the method further comprises:

receiving fifth signaling, wherein the fifth signaling carries L mask identifiers and L masks, the L masks are in a one-to-one correspondence with the L mask identifiers, the L mask identifiers comprise the first mask identifier, and L is an integer greater than 0.

5. The method according to claim 1, wherein the terminal device comprises an electronic tag.

6. The method according to claim 5, wherein the electronic tag is a radio frequency identification tag.

7. The method according to claim 1, wherein a correspondence between the first mask identifier and the first mask is preset.

8. A communication method, wherein the method is applied to a read/write device, and the method comprises:

receiving first signaling from a core network device, wherein the first signaling indicates a first storage location and a first mask, the first signaling carries a first mask identifier, and the first mask identifier identifies at least one of the first storage location or the first mask; and sending the first signaling to at least one terminal device, wherein at least one of the following is preset:

a correspondence between the first mask identifier and the first storage location, or a correspondence between the first mask identifier and the first mask.

9. The method according to claim 8, wherein the first mask identifier indicates at least two of the following: start address information of the first storage location, a length of the first storage location, or end address information of the first storage location.

10. The method according to claim 8, wherein the first mask identifier further indicates a length of a second mask.

11. An apparatus, comprising:

at least one processor; and a memory coupled to the at least one processor and having program instructions stored thereon which, when executed by the at least one processor, cause the apparatus to:

receive first signaling, wherein the first signaling indicates a first storage location and a first mask, the first signaling carries a first mask identifier, and the first mask identifier identifies at least one of the first storage location or the first mask;

determine, based on the first signaling, a second mask stored at the first storage location; and perform random access when the first mask matches the second mask, wherein the program instructions further cause the apparatus to:

receive third signaling, wherein the third signaling carries K mask identifiers and K storage locations, the K storage locations are in a one-to-one correspondence with the K mask identifiers, the K mask identifiers comprise the first mask identifier, and K is an integer greater than 0.

12. The apparatus according to claim 11, wherein a correspondence between the first mask identifier and the first mask is preset.

13. The apparatus according to claim 11, the program instructions further cause the apparatus to:

receive fourth signaling, wherein the fourth signaling carries M mask identifiers that comprise the first mask identifier, and M is an integer greater than 0; and send a response message to the fourth signaling, wherein the response message carries M masks, and the M masks are in a one-to-one correspondence with the M mask identifiers.

14. The apparatus according to claim 11, the program instructions further cause the apparatus to:

receive fifth signaling, wherein the fifth signaling carries L mask identifiers and L masks, the L masks are in a one-to-one correspondence with the L mask identifiers, the L mask identifiers comprise the first mask identifier, and L is an integer greater than 0.

15. The apparatus according to claim 11, wherein the apparatus comprises an electronic tag.

16. The apparatus according to claim 15, wherein the electronic tag is a radio frequency identification tag.

17. An apparatus, comprising:

at least one processor; and a memory coupled to the at least one processor and having program instructions stored thereon which, when executed by the at least one processor, cause the apparatus to:

receive first signaling from a core network device, wherein the first signaling indicates a first storage location and a first mask, the first signaling carries a first mask identifier, the first mask identifier identifies at least one of the first storage location or the first mask, and the first mask identifier indicates a length of a second mask; and send the first signaling to at least one terminal device.

18. The apparatus according to claim 17, wherein at least one of a correspondence between the first mask identifier and the first storage location is preset, or a correspondence between the first mask identifier and the first mask is preset.

19. The apparatus according to claim 17, wherein the first mask identifier indicates at least two of the following: start address information of the first storage location, a length of the first storage location, or end address information of the first storage location.

20. The apparatus according to claim 17, wherein the apparatus is an access network device.

* * * * *